(12) United States Patent
Lakhera et al.

(10) Patent No.: US 11,627,079 B2
(45) Date of Patent: Apr. 11, 2023

(54) APPARATUS AND METHODS FOR EMBEDDING SECURITY ASSOCIATION IDENTIFIER IN IP ADDRESS

(71) Applicant: Apple Inc., Cupertino, CA (US)

(72) Inventors: Prabhakar Lakhera, San Jose, CA (US); David Schinazi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 16/995,155

(22) Filed: Aug. 17, 2020

(65) Prior Publication Data

US 2021/0377169 A1 Dec. 2, 2021

Related U.S. Application Data

(60) Provisional application No. 63/033,637, filed on Jun. 2, 2020.

(51) Int. Cl.
*H04L 45/741* (2022.01)
*H04L 9/08* (2006.01)
*H04L 45/42* (2022.01)

(52) U.S. Cl.
CPC .......... *H04L 45/741* (2013.01); *H04L 9/0819* (2013.01); *H04L 9/0869* (2013.01); *H04L 45/42* (2013.01)

(58) Field of Classification Search
CPC ... H04L 45/741; H04L 9/0819; H04L 9/0869; H04L 45/42
See application file for complete search history.

(56) References Cited

U.S. PATENT DOCUMENTS

| 7,027,445 | B1 | 4/2006 | Sunada et al. |
| 7,774,456 | B1 | 8/2010 | Lownsbrough et al. |
| 9,160,707 | B2 | 10/2015 | Ludwig |
| 9,820,182 | B2 | 11/2017 | Welin et al. |
| 10,736,029 | B1* | 8/2020 | Young ..................... H04W 8/26 |
| 11,140,078 | B1* | 10/2021 | Gangam ................ H04L 45/748 |
| 11,178,054 | B1* | 11/2021 | Zamsky ................. H04L 45/748 |
| 2004/0053601 | A1* | 3/2004 | Frank ..................... H04L 47/805 455/411 |
| 2009/0013175 | A1* | 1/2009 | Elliott .................. H04L 63/0428 709/224 |
| 2010/0284300 | A1* | 11/2010 | Deshpande ............ H04L 43/026 370/253 |

(Continued)

*Primary Examiner* — Catherine Thiaw
(74) *Attorney, Agent, or Firm* — Fletcher Yoder PC

(57) ABSTRACT

An electronic device includes an address generator module that generates a source address for each traffic class to be sent using a network interface. The source address includes a Unique Local Address (ULA) prefix and an interface identifier having a traffic class identifier as one or more most significant bits and a randomly generated remainder. The address generator module generates a destination address having the ULA prefix and the traffic class identifier. When a processor of the electronic device is selecting a source address for the traffic class according to rules of a network layer protocol (e.g., IPv6), including a rule that a longest matching address of possible source addresses to the given destination is selected as the source address, the generated source address is selected due to the one or more most significant bits of the interface identifier matching with the traffic class identifier of the destination address.

20 Claims, 7 Drawing Sheets

(56) References Cited

U.S. PATENT DOCUMENTS

| | | | |
|---|---|---|---|
| 2012/0099592 A1* | 4/2012 | Ludwig | H04L 61/2514 |
| | | | 370/392 |
| 2016/0142321 A1* | 5/2016 | Gage | H04W 76/10 |
| | | | 370/235 |
| 2016/0344688 A1* | 11/2016 | Lakhera | H04L 61/4511 |
| 2017/0264600 A1* | 9/2017 | Froelicher | H04L 63/0823 |
| 2019/0199628 A1* | 6/2019 | Amin | H04L 69/22 |
| 2019/0230065 A1* | 7/2019 | Panchapakesan | H04L 63/029 |
| 2019/0306134 A1* | 10/2019 | Shanbhogue | G06F 21/64 |
| 2021/0044586 A1* | 2/2021 | Sharma | H04L 63/0884 |

* cited by examiner

APPARATUS AND METHODS FOR EMBEDDING SECURITY ASSOCIATION IDENTIFIER IN IP ADDRESS

CROSS-REFERENCE TO RELATED APPLICATION

This application claims the benefit of U.S. Provisional Application No. 63/033,637, filed Jun. 2, 2020, which is hereby incorporated by reference in its entirety for all purposes.

BACKGROUND

The present disclosure relates generally to computer networks, and more particularly to securely sending and receiving information over a computer network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A network interface of a computing device may connect to another computing device, and send and receive difference classes of traffic (e.g., data packets) to and from the other computing device in different sessions. Each class of traffic may be associated with a different security association and a different address (e.g., Internet Protocol (IP) address). In particular, for the same computing device, a first portion or prefix of the address may be the same, while a second portion of the address may be randomly generated. Moreover, each session (between the two computing devices) may encrypt corresponding traffic with different encryption keys.

However, applications running on the computing devices may not be aware of the security association associated with a particular data packet. Additionally, a network layer protocol (e.g., IP version 6 (IPv6)) may cause a source address of the network interface to be selected based on a given destination address and a set of rules (e.g., according to the rules of IPv6). For example, one rule of IPv6 is that a longest matching address of possible source addresses to the given destination is selected as the source address. Because two classes of traffic being sent over two sessions of the same network interface may have IP addresses having a same prefix portion and subsequent randomly generated portions, for a given destination address (of only which the prefix portion may be known and thus provided), an incorrect source address may be selected using such rules. And because different encryption keys are associated with different security associations, an incorrect source address for data received at a destination address may cause security association look-up failure for the data flow between the computing devices, resulting in data path failure and/or data to be locally dropped in the network stack between the computing devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may include an address generator module that generates an address (e.g., an Internet Protocol (IP) address) for each traffic class to be sent using a network interface. Each traffic class may be associated with a different security association that causes the traffic class to be encrypted using a different encryption key. The address generator module may embed a traffic class identifier in the address. For example, the address may be a 128 bit IP version 6 (IPv6) address having a first 64 bit Unique Local Address (ULA) prefix and a second 64 bit interface identifier. The address generator module may embed the traffic class identifier in one or more most significant bits of the interface identifier.

The ULA prefix and the traffic class identifier may be used as a destination address for the corresponding traffic class to be sent using the network interface, while the generated address may be used a possible source address. As a result, when a processor of the electronic device is selecting a source address for the traffic class from a pool of source addresses according to rules of a network layer protocol (e.g., IPv6), including a rule that a longest matching address of possible source addresses to the given destination is selected as the source address, the generated address may be selected due to the one or more most significant bits of the interface identifier matching with the traffic class identifier of the destination address.

In this manner, the correct source address may be used when sending data of a certain traffic class to a destination address. Consequently, the correct security association may be associated with the data, and the proper encryption key may be used to decrypt the data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "in some embodiments" of the present disclosure are not intended to be interpreted as excluding the existence of additional embodiments that also incorporate the recited features.

The disclosed embodiments may apply to a variety of electronic devices. In particular, any electronic device that transmits or receives signals over a communication network may incorporate the disclosed address generator module or techniques to embed a traffic class identifier in an address. With the foregoing in mind, a general description of suitable electronic devices that may include the disclosed address generator module or techniques is provided below.

Figure 1:
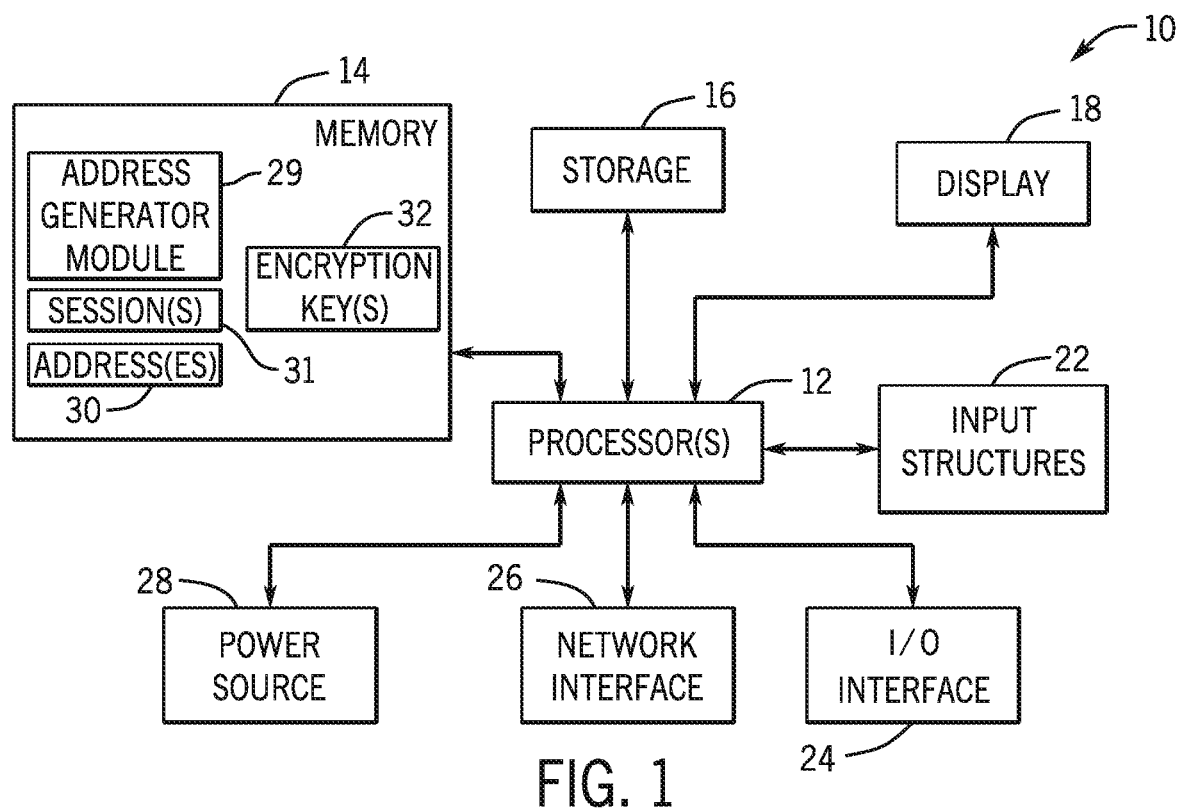
FIG. 1 is a schematic block diagram of an electronic device including a transceiver, in accordance with an embodiment.

Turning first to FIG. 1, an electronic device 10 according to an embodiment of the present disclosure may include, among other things, one or more of processors 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10. Additionally, reference to the processor 12 in the present disclosure should be understood to include any processor or combination of processors of the one or more of processors 12.

Figure 2:
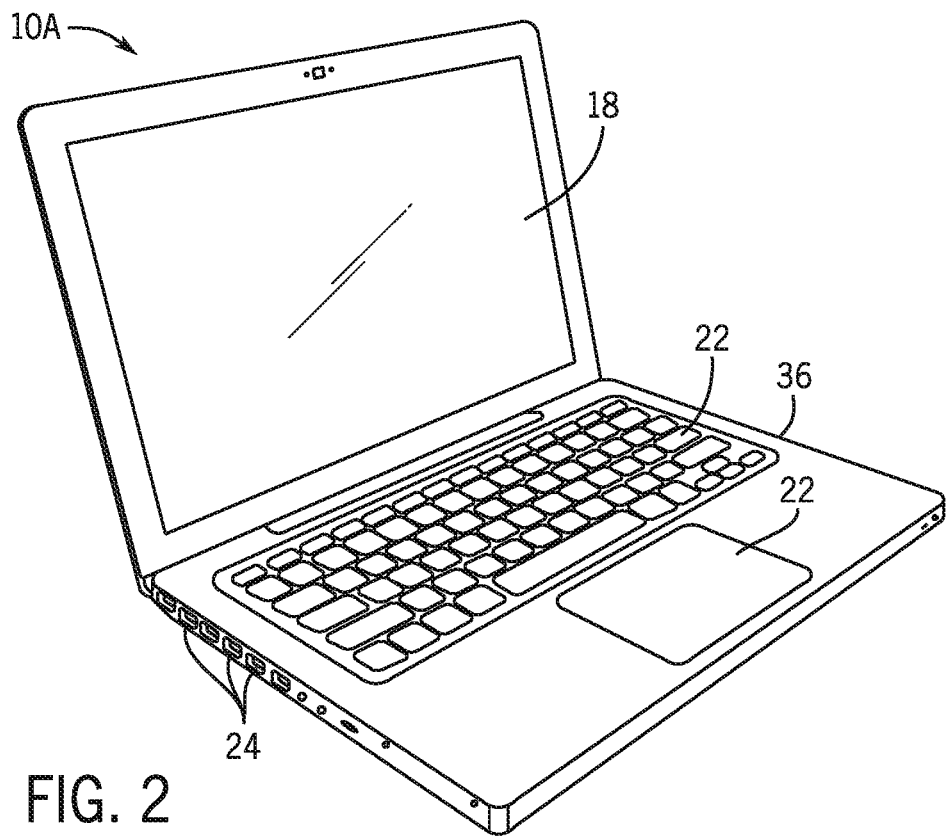
FIG. 2 is a perspective view of a notebook computer representing a first embodiment of the electronic device of FIG. 1.
Figure 4:
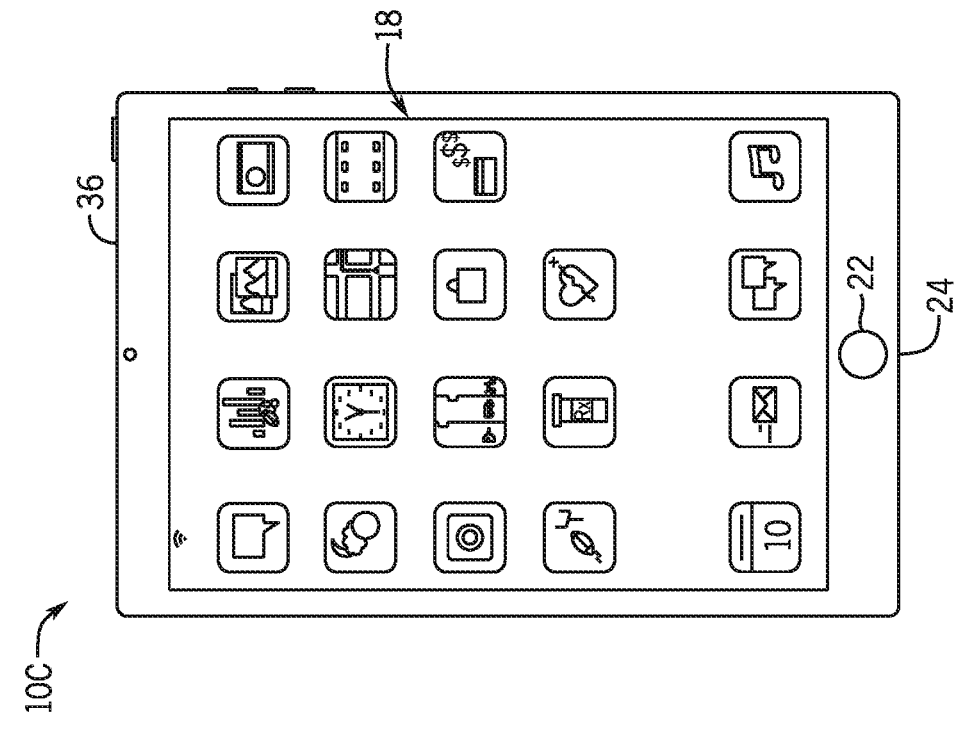
FIG. 4 is a front view of another handheld device representing a third embodiment of the electronic device of FIG. 1.
Figure 3:
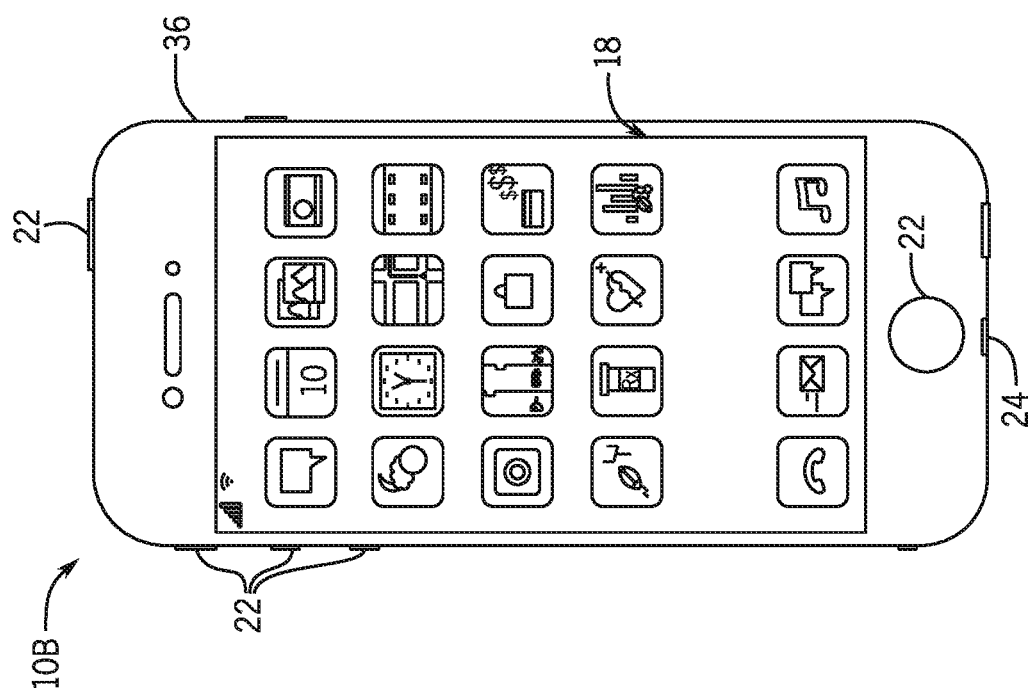
FIG. 3 is a front view of a handheld device representing a second embodiment of the electronic device of FIG. 1.
Figure 5:
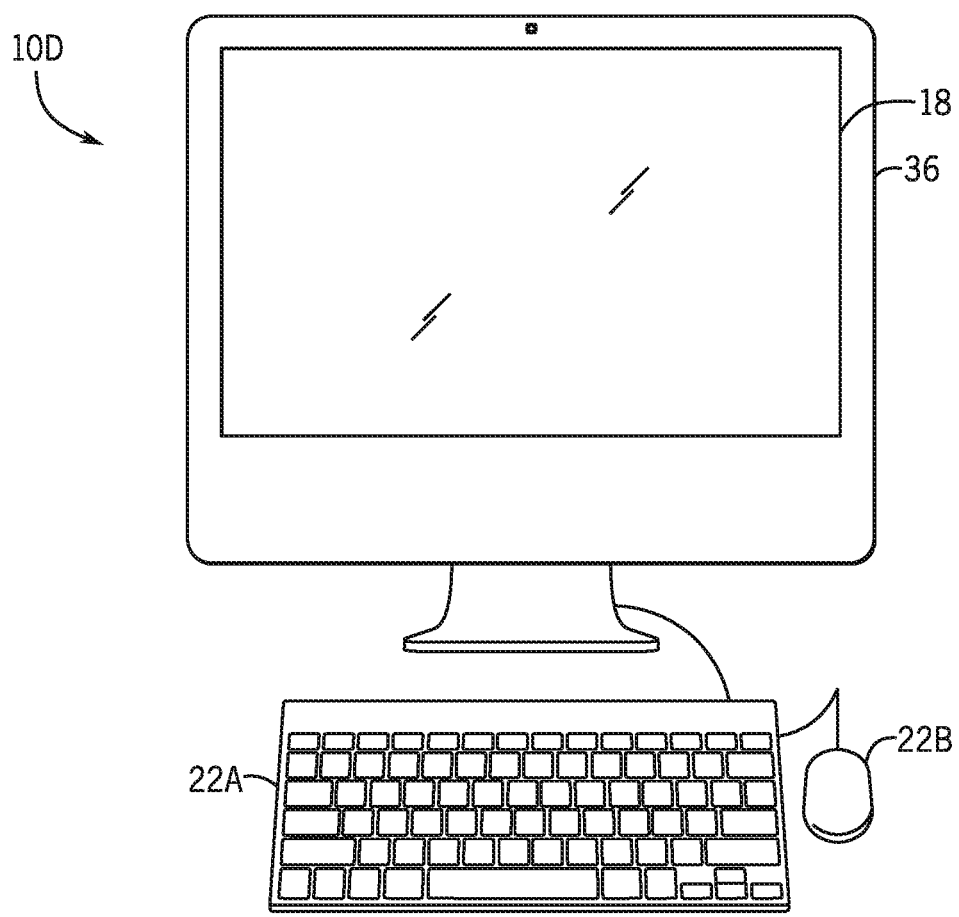
FIG. 5 is a front view of a desktop computer representing a fourth embodiment of the electronic device of FIG. 1.
Figure 6:
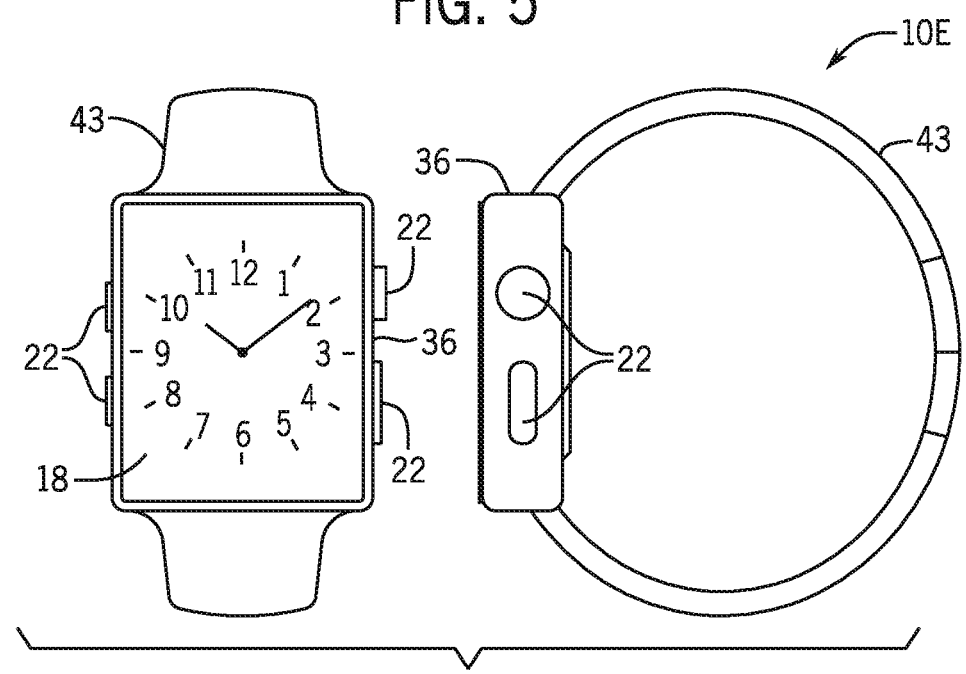
FIG. 6 is a front view and side view of a wearable electronic device representing a fifth embodiment of the electronic device of FIG. 1.

By way of example, a block diagram of the electronic device 10 may represent the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

As illustrated, the memory 14 may store an address generator module 29 as instructions executable by the processor 12. The address generator module 29 may generate one or more addresses 30 (e.g., Internet Protocol (IP) addresses) for use by one or more network interfaces 26 (e.g., one or more IP security (IPSec) network interfaces). In particular, the address generator module 29 may generate an address 30 for each session 31 (e.g., IPSec session) used by the network interface 26 to send and receive information to and from another electronic device. IPSec is an Internet Engineering Task Force (IETF) standard suite of protocols used between two communication points across an IP network that provides data authentication, integrity, and confidentiality. IPSec also defines encryption, decryption, and authentication for packets, and secure key exchange and key management.

In some embodiments, each session 31 opened by the processor 12 may correspond to a different traffic class to be sent using the network interface 26. The memory 14 may additionally or alternatively store one or more encryption keys 32 that correspond to a security association associated with each traffic class. While the address generator module 29, the one or more addresses 30, the one or more sessions 31, and the one or more encryption keys 32 are illustrated as being stored in the memory 14, it should be understood that these elements may be stored in any suitable medium or component, such as the storage 16 and/or the network interface 26. Moreover, while the address generator module 29 is described as software, it should be understood that the address generator module 29 may be implemented, in whole or in part, as firmware (e.g., stored on the memory 14 or storage 16) and/or hardware (e.g., as part of the processor 12 and/or the network interface 26) of the electronic device 10.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26.

The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, long term evolution (LTE®) cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The network interface 26 may be implemented as software (e.g., as a logical construct) and/or hardware (e.g., as a network interface controller, card, or adapter).

As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

In certain embodiments, as previously noted above, each embodiment (e.g., notebook computer 10A, handheld device 10B, handheld device 10C, computer 10D, and wearable electronic device 10E) of the electronic device 10 may include the disclosed address generator module 29 or techniques to embed a traffic class identifier in an address.

Figure 7:
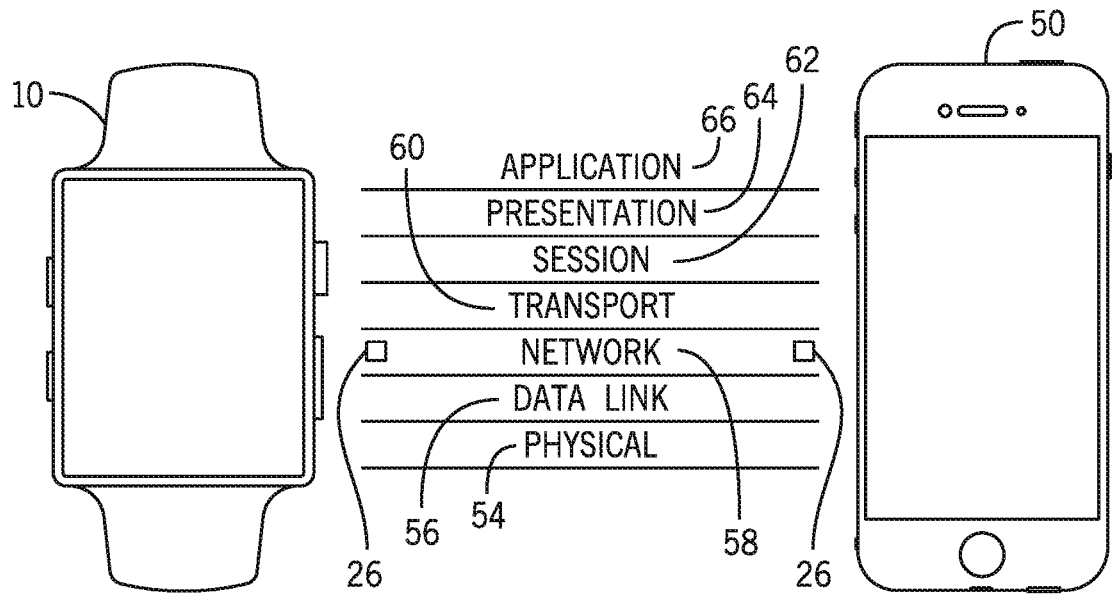
FIG. 7 is a diagram showing the electronic device of FIG. 1 communicating with another electronic device and corresponding Open Systems Interconnection model layers, according to embodiments of the present disclosure.

With the foregoing in mind, FIG. 7 is a diagram showing the electronic device 10 communicating with another electronic device 50 and the corresponding Open Systems Interconnection (OSI) model layers, according to embodiments of the present disclosure. As illustrated, the electronic device 10 may communicate with the other electronic device 50 via respective network interfaces 26, 52. The OSI model layers include a physical layer 54, a data link layer 56, a network layer 58, a transport layer 60, a session layer 62, a presentation layer 64, and an application layer 66. In particular, because the disclosed address generator module 29 and techniques may generate and process IP addresses, the disclosed address generator module 29 and techniques relate to the network layer 58.

Figure 8:
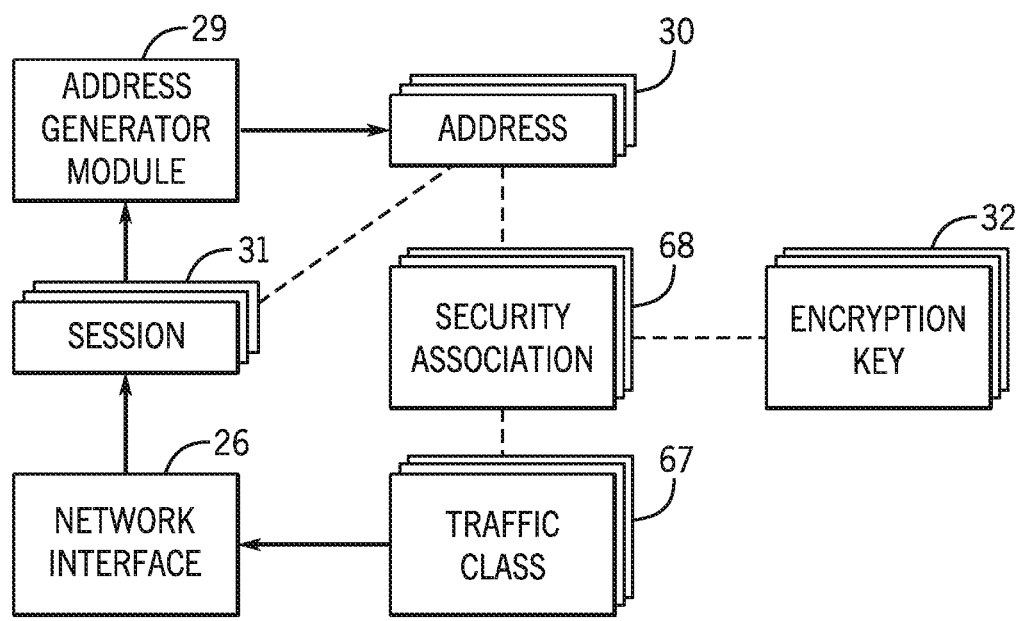
FIG. 8 is a block diagram illustrating relationships between components of the electronic device of FIG. 1 for embedding a traffic class or security association identifier in an address, according to embodiments of the present disclosure.

FIG. 8 is a block diagram illustrating relationships between components for embedding a traffic class or security association identifier in an address 30, according to embodiments of the present disclosure. The processor 12 may receive indications of each traffic class 67 for outgoing or incoming data via the network interface 26. Each traffic class 67 may correspond to a different state of the electronic device 10. For example, the data may be of a Class D traffic class, for which the data may be sent or received when the electronic device 10 has connectivity (e.g., to the other electronic device 50), but the electronic devices 10, 50 have not yet been "unlocked" (e.g., a respective user has not proceeded past a "lock screen" of each device 10, 50 through an authentication procedure, and thus may not freely operate the respective device 10, 50). As another example, the data may be of a Class C traffic class, for which the data may be sent or received when the electronic device 10 and the other electronic device 50 are both in an unlocked state (e.g., a respective user has unlocked each device 10, 50 through an authentication procedure and may freely operate the respective device 10, 50). It should be understood that the Class C and D traffic classes are being used as examples, and any other suitable traffic class is contemplated for application of the disclosed techniques.

Because each traffic class 67 may correspond to a different state of the electronic device, 10, each traffic class 67 may also correspond to different security properties (e.g., different security associations 68). For example, Class D traffic may include identifying the electronic device 10 to the other electronic device 10, synchronizing the electronic device 10 with the other electronic device 10, and so on. As another example, Class C traffic may include personal user data, synchronizing software application data between the electronic device 10 and the other electronic device 10, and so on. Thus, Class D traffic may be of a relatively lower security level compared to Class C traffic. In particular, each security association 68 may be associated with a respective encryption key 32 for encrypting and decrypting the corresponding traffic class 67.

For each traffic class 67 of outgoing or incoming data, the processor 12 may create a respective session 31 for the network interface 26. In response to an indication of each traffic class 67 or creating of each session 31, the address generator module 29 may generate an address 30 (e.g., an Internet Protocol (IP) address) for the session 31. For example, if the address 30 is a 128 bit IP version 6 (IPv6) address, the address 30 may include a 64 bit prefix Unique Local Address (ULA) and a remaining 64 bit interface identifier. The ULA prefix may be the same for local and peer addresses (e.g., addresses of the network interfaces 26 of the electronic device 10 and the connecting electronic device 50), while the interface identifier may be randomly generated when the electronic device 10 and the other electronic device 50 are initially connected together (e.g., at pairing time).

However, applications running on the electronic device 10 may not be aware of the security association 68 associated with a particular data packet. Additionally, for certain network layer protocols, such as IPv6, a source address of the network interface 26 may be selected based on a given destination address and a set of rules (e.g., according to the rules of IPv6). For example, the Internet Engineering Task Force's (IETF) Request for Comments (RFC) 6724 (published September 2012), Section 5, explains that, for IPv6, for IP addresses that are the same (e.g., match or correlate) in terms of scope, outgoing interface, usability, and so on, the source address that will be selected among available source addresses is the source address that matches the destination address for the greatest length. Because two traffic classes 67 being sent over two sessions 31 of the same network interface 26 may have IP addresses (e.g., 30) having a same ULA portion and randomly generated interface identifiers, for a given destination address (of only which the prefix portion may be known and thus provided), an incorrect source address may be selected. And because different encryption keys are associated with different security associations, an incorrect source address for data received at a destination address may cause security association look-up failure for the data flow between the electronic device 10 and the other electronic device 50, resulting in data path failure and/or data to be locally dropped in the network stack between the electronic device 10 and the other electronic device 50.

While, in some cases, the source address may be set by the processor 12 or a different source address selection may be built, implementation may involve adding logic and/or software to the electronic device 10. Instead, it may be advantageous to use existing network layer protocols, such as those of IPv6, and generate an address 30 that may be successfully selected as the source address. To do so, the address generator module 29 may embed an indicator or identifier of the traffic class 67 or the security association 68 in the interface identifier portion of the address 30. The remainder of the discloser may refer to this identifier as a traffic class identifier that identifies a traffic class 67 of outgoing or incoming data, but it should be understood that, because each traffic class 67 is associated with a respective security association 68, the identifier may alternatively or additionally identify the respective security association 68, and thus be referred to as a security association identifier.

In particular, because IPv6 selects a source address based on the available source address that has the greatest matching length with the destination address, the address generator module 29 may embed the traffic class identifier in one or more most significant bits of the interface identifier of the IP address 30. As such, when the processor 12 selects the source address, the processor 12 may match the source address to the destination address because both addresses may have the same ULA prefix and the same one or more most significant bits of the interface identifier. In this manner, the correct source address may be used when sending data of a certain traffic class 67 to a destination address. Consequently, the correct security association 68 may be associated with the data, and the proper encryption key 32 may be used to decrypt the data.

Figure 9:
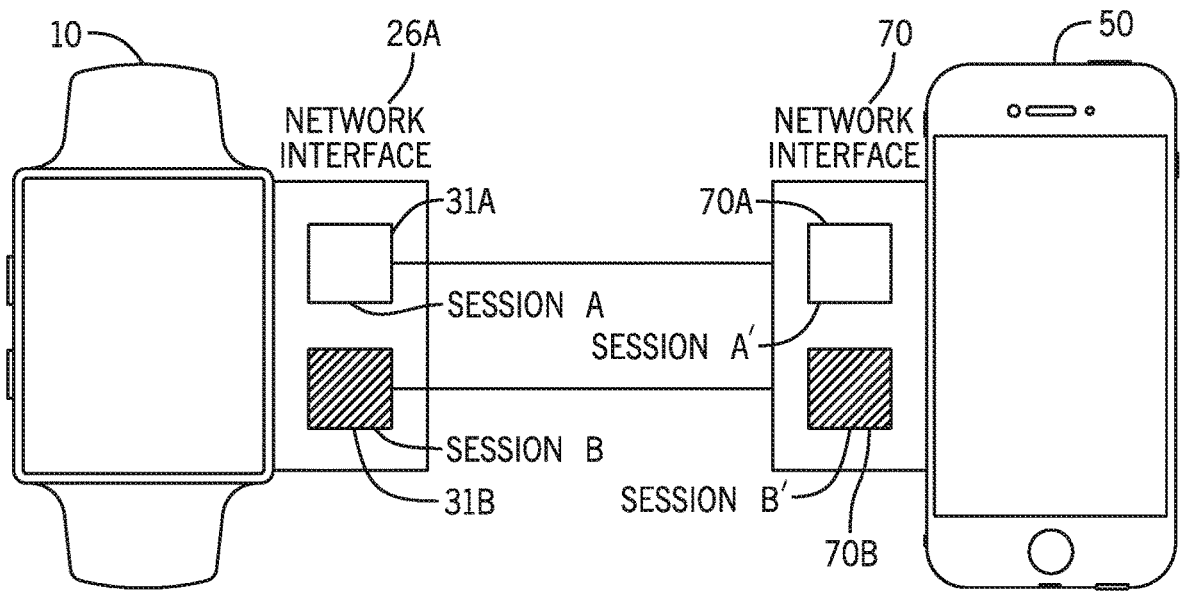
FIG. 9 is a schematic diagram illustrating the electronic device of FIG. 1 connected to another electronic device using the network interface over two sessions, according to embodiments of the present disclosure.

FIG. 9 is a schematic diagram illustrating the electronic device 10 connected to another electronic device 80 using the network interface 26A over two sessions 31A, 31B, according to embodiments of the present disclosure. As illustrated, the electronic device 10 may be a wearable electronic device (e.g., 10E) and the other electronic device 50 may be a handheld device (e.g., 10B), though it should be understood that the disclosed techniques may apply to any suitable electronic devices (e.g., two handheld devices, a wearable electronic device and a computer (e.g., 10D), two wearable electronic devices, and so on). The processor 12 may have opened each session 31 for a corresponding traffic class 67. For example, the processor 12 may have opened session 31A ("Session A") for Class D traffic, and session 31B ("Session B") for Class C traffic. As illustrated, a network interface 26A (e.g., an IPSec interface) may be used to operate both sessions 31.

The sessions 31 may connect the electronic device 10 to the other electronic device 50. The other electronic device 50 may likewise open sessions 70A, 70B corresponding to the sessions 31A, 31B, respectively. In particular, other electronic device 50 may have opened session 70A ("Session A'") for Class D traffic to correspond to Session A, and session 70B ("Session B'") for Class C traffic to correspond to Session B.

Figure 10:
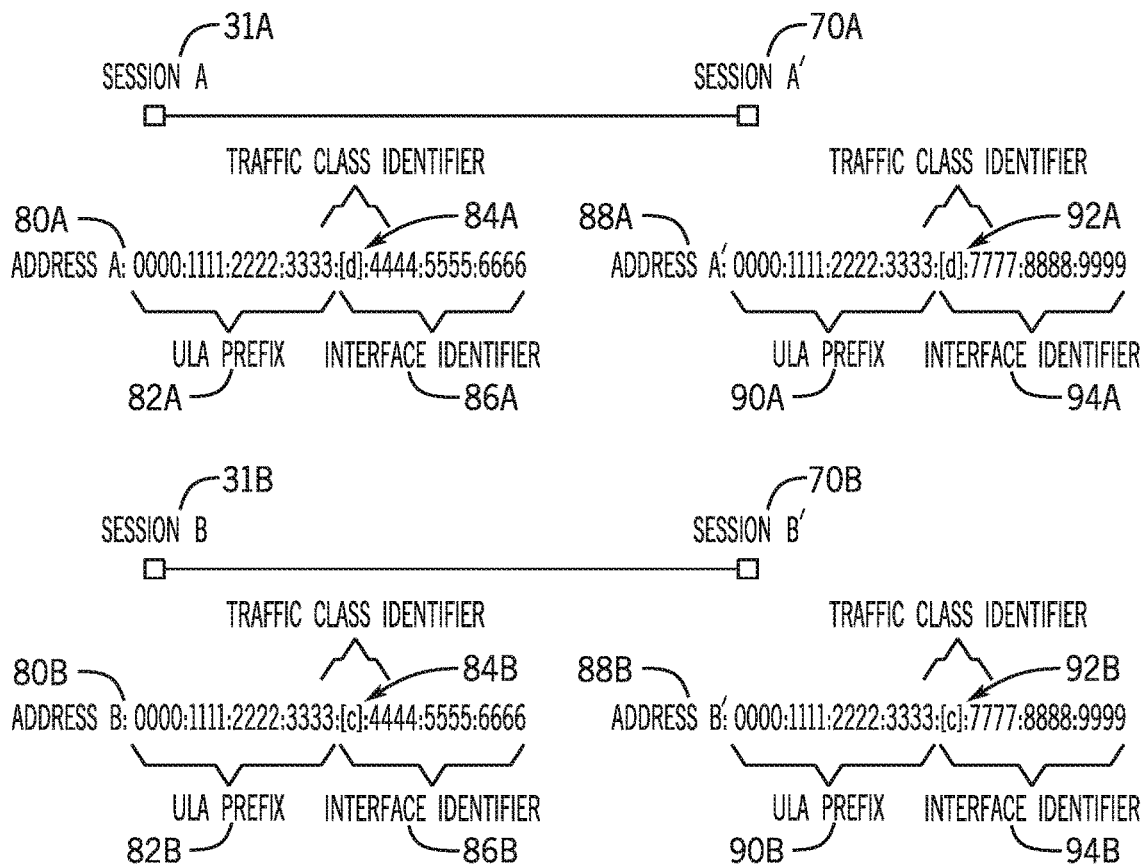
FIG. 10 is a schematic diagram illustrating the addresses used to enable proper communication via the sessions in FIG. 9, according to embodiments of the present disclosure.

FIG. 10 is a schematic diagram illustrating the addresses 30 used to enable proper communication via the sessions 31, 70 in FIG. 9, according to embodiments of the present disclosure. In particular, the address generator module 29 may generate a first address 80A ("Address A") for the Session A 31A at the electronic device 10. The address generator module 29 may also generate a second address 80B ("Address B") for the Session B 31B at the electronic device 10. The ULA prefixes 82A, 82B of Address A and Address B are generated to be the same. However, because Session A corresponds to Class D traffic, the address generator module 29 embeds a first traffic class identifier 84A (e.g., "d") that indicates Class D traffic in the two most significant bytes of an interface identifier 86A of Address A. Because Session B corresponds to Class C traffic, the address generator module 29 embeds a second traffic class identifier 84B (e.g., "c") that indicates Class C traffic in the two most significant bytes of an interface identifier 86B of Address B.

The traffic class identifiers 84 are illustrated as being two bytes long, but it should be understood that the traffic class identifiers 84 may be of any suitable length that may identify the traffic class (e.g., between one bit and 12 bytes, including one bit, two bits, four bits, one byte, two bytes, four bytes, and so on). The address generator module 29 may randomly generate the remainder of the interface identifiers 86. As such, the remainder of the interface identifiers 86A, 86B of Address A and Address B may be the same.

It should be understood that the other electronic device 50 may also include an address generator module that generates a similar addresses 88A ("Address A'"), 88B ("Address B'") for Session A' 70A and Session B' 70B, respectively. Per the network layer protocol (e.g., IPv6), the ULA prefixes 90A, 90B of Address A' and Address B', respectively, may be the same as the ULA prefixes 82A, 82B of Address A and Address B, respectively. Similarly, the address generator module of the other electronic device 50 may embed a first traffic class identifier 92A (e.g., "d") that indicates Class D traffic in the two most significant bytes of an interface identifier 94A of Address A', and may embed a second traffic class identifier 92B (e.g., "c") that indicates Class C traffic in the two most significant bytes of an interface identifier 94B of Address B'. The address generator module of the other electronic device 50 may randomly generate the remainder of the interface identifiers 94, such that the remainder of the interface identifiers 94A, 94B are the same.

Each session pair (e.g., Session A-Session A', Session B-Session B') or address pair (e.g., Address A-Address A', Address B-Address B') may correspond to a particular security association 68, as each session pair or address pair corresponds to a different traffic class 67. Each security association 68 corresponds to a different encryption key 32 used to encrypt and decrypt data of the corresponding traffic class 67. When sending data of Class D, the processor 12 may identify a destination address as having the ULA prefix 82A and the traffic class identifier 84A ("d"). Due to the IPv6 rule of that a longest matching address of possible source addresses to a given destination address is selected as the source address, the address generator module 29 ensures that Address A (which has the ULA prefix 82A and the traffic class identifier 84A ("d")) is selected instead of Address B (which has the ULA prefix 82A, but the traffic class identifier 84B ("c")). Similarly, when sending data of Class C, the processor 12 may identify a destination address as having the ULA prefix 82B and the traffic class identifier 84B ("c"). The address generator module 29 ensures that Address B (which has the ULA prefix 82B and the traffic class identifier 84A ("c")) is selected instead of Address A (which has the ULA prefix 82B, but the traffic class identifier 84B ("d")). As a result, the proper source addresses are selected, and the proper encryption key 32 may be used to encrypt and decrypt data of the corresponding traffic class 67.

Figure 11:
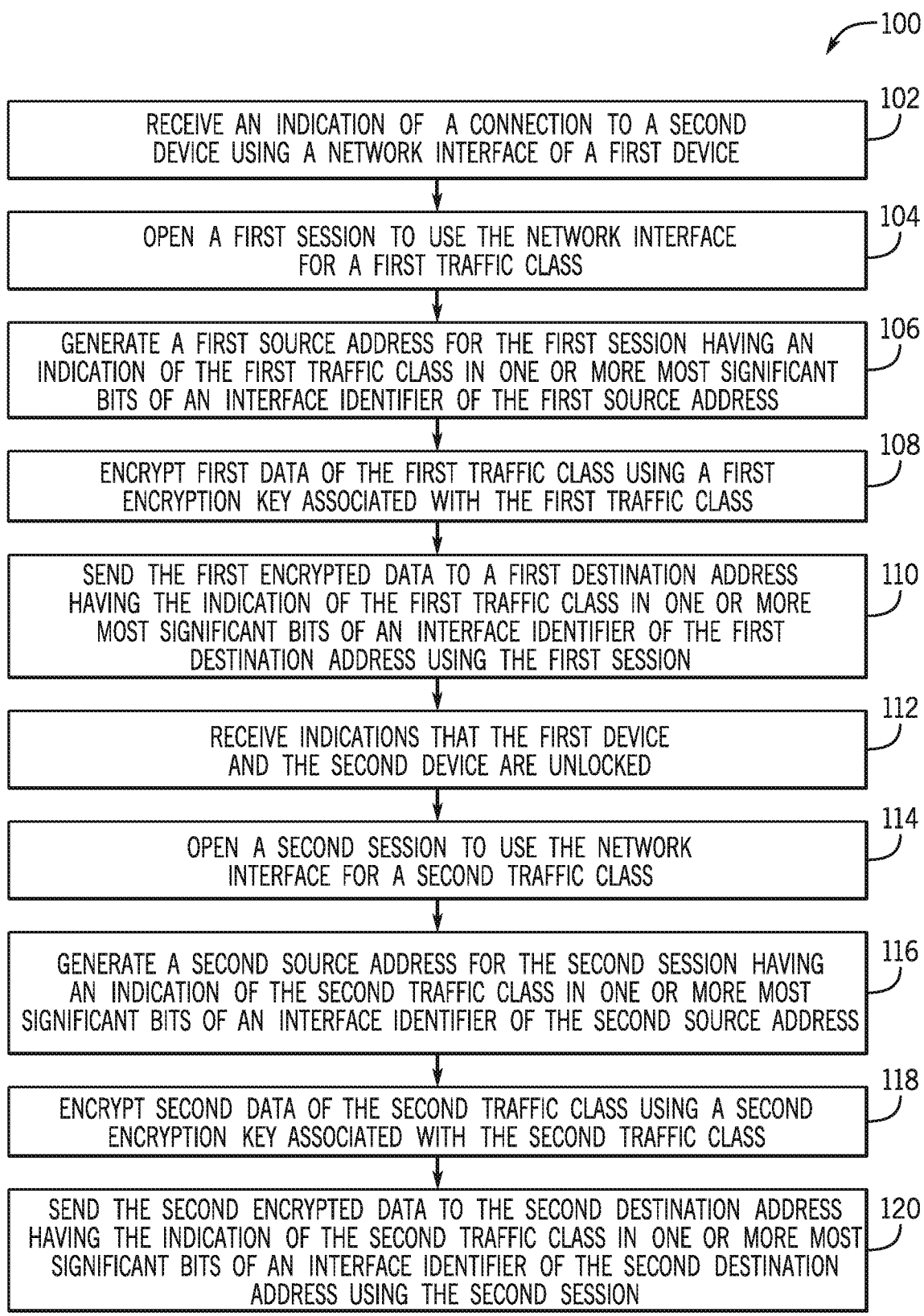
FIG. 11 is a flowchart of a method for encrypting and sending data of different traffic classes or having different security associations from the electronic device of FIG. 1, according to embodiments of the present disclosure.

FIG. 11 is a flowchart of a method 100 for encrypting and sending data of different traffic classes 67 or having different security associations 68 from the electronic device 10, according to embodiments of the present disclosure. Any suitable device (e.g., a controller) that may control components of the electronic device 10, such as the processor 12, may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the electronic device 10, the address generator module 29 (as described below), and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the processor 12 receives an indication of a connection to a second device (e.g., the other electronic device 50) using a network interface (e.g., 26) of a first device (e.g., the electronic device 10). In particular, the connection may enable sending a first class of traffic (e.g., Class D traffic) instead of a second class of traffic (e.g., Class C traffic). This may be because of the states of the electronic device 10 and the other electronic device 50. For example, at least one of the electronic device 10 and the other electronic device 50 may still be "locked", such that at least one of the respective users of the devices 10, 50 has not authenticated themselves and passed a "lock screen" of the devices 10, 50. As a result, Class D traffic may be sent between the two devices 10, 50, but not Class C traffic. As mentioned above, in some embodiments, the network interface 26 may be an IPSec interface. In process block 104, the processor 12 opens a first session (e.g., Session A 31A) to use the network interface 26 for the first traffic class (e.g., Class D traffic).

In process block 106, the address generator module 29 generates a first source address (e.g., Address A 80A) for the first session having an indication of the first traffic class (e.g., the traffic class identifier 84A "d") in one or more most significant bits of an interface identifier (e.g., 86A) of the first source address. The address generator module 29 may generate the ULA prefix (e.g., 82A) of the first source address 80A, as well as randomly generate the remainder of the interface identifier 86A.

In process block 108, the processor 12 encrypts first data of the first traffic class using a first encryption key 32 associated with the first traffic class. That is, the first traffic class may be associated with a first security association, which may in turn be associated with the first encryption key 32. This first encryption key 32 may be used to encrypt data of the first traffic class.

In process block 110, the processor 12 sends the first encrypted data to a first destination address having the indication of the first traffic class (e.g., the traffic class identifier 92A "d") using the first session. In particular, the processor 12 may set the destination address using the same ULA prefix (e.g., 82A) of the first source address 80A, followed by the indication of the first traffic class.

In process block 112, the processor 12 may receive indications that the first device and the second device are unlocked. It should be understood that the indications of the devices 10, 50 are unlocked are merely illustrative examples, and any suitable indication that the devices 10, 50 are in states to receive a class of data different from the first traffic class is contemplated. In process block 114, the processor 12 opens a second session (e.g., Session B 31B) to use the network interface 26 for the second traffic class (e.g., Class C traffic).

In process block 116, the address generator module 29 generates a second source address (e.g., Address B 80B) for the second session having an indication of the second traffic class (e.g., the traffic class identifier 84B "c") in one or more most significant bits of an interface identifier (e.g., 86B) of the second source address. The address generator module 29 may generate the ULA prefix (e.g., 82B) of the second source address 80B, which may be the same as the ULA prefix 82A of the first source address 80A, as well as randomly generate the remainder of the interface identifier 86B, which may be the same as the remainder of the interface identifier 86A of the first source address 80A.

In process block 118, the processor 12 encrypts second data of the second traffic class using a second encryption key 32 associated with the second traffic class. That is, the second traffic class may be associated with a second security association, which may in turn be associated with the second encryption key 32. This second encryption key 32 may be used to encrypt data of the second traffic class.

In process block 120, the processor 12 sends the second encrypted data to a second destination address having the indication of the second traffic class (e.g., the traffic class identifier 92B "d") using the second session. In particular, the processor 12 may set the second destination address using the same ULA prefix (e.g., 82B) of the second source address 80B, followed by the indication of the second traffic class.

The other electronic device 50 may receive the first encrypted data of Class D traffic at the session (Session A' 70A) and address (Address A' 88A) intended for Class D traffic. As such, the other electronic device 50 may apply the appropriate security association 68 to the first encrypted data, and decrypt the first encrypted data with the appropriate encryption key 32. Similarly, the second encrypted data of Class C traffic may be received at the session (Session B' 70B) and address (Address B' 88B) intended for Class C traffic. As such, the other electronic device 50 may apply the appropriate security association 68 to the second encrypted data, and decrypt the second encrypted data with the appropriate encryption key 32. In this manner, the method 100 may enable the electronic device 10 to send data of different traffic classes 67 or having different security associations 68 using the same network interface 26, while ensuring that the proper encryption key 32 is used to encrypt and decrypt the data.

Figure 12:
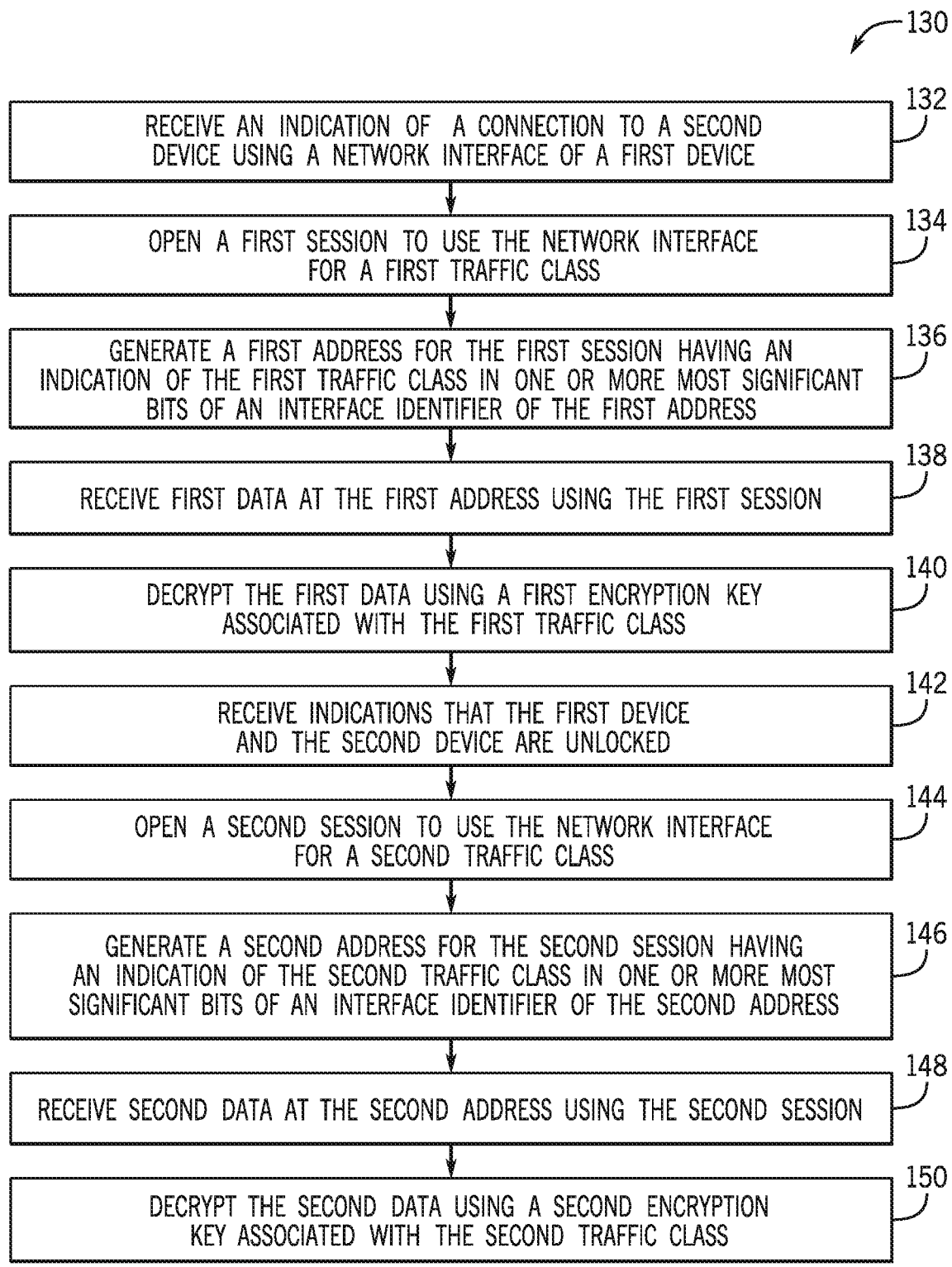
FIG. 12 is a flowchart of a method for receiving and decrypting data of different traffic classes or having different security associations at the electronic device of FIG. 1, according to embodiments of the present disclosure.

FIG. 12 is a flowchart of a method 130 for receiving and decrypting data of different traffic classes 67 or having different security associations 68 at the electronic device 10, according to embodiments of the present disclosure. Any suitable device (e.g., a controller) that may control components of the electronic device 10, such as the processor 12, may perform the method 130. In some embodiments, the method 130 may be implemented by executing instructions stored in a tangible, non-transitory, computer-readable medium, such as the memory 14 or storage 16, using the processor 12. For example, the method 130 may be performed at least in part by one or more software components, such as an operating system of the electronic device 10, the address generator module 29 (as described below), and the like. While the method 130 is described using steps in a specific sequence, it should be understood that the present disclosure contemplates that the described steps may be performed in different sequences than the sequence illustrated, and certain described steps may be skipped or not performed altogether.

In process block 132, the processor 12 receives an indication of a connection to a second device (e.g., the other electronic device 50) using a network interface (e.g., 26) of a first device (e.g., the electronic device 10). In particular, the connection may enable sending a first class of traffic (e.g., Class D traffic) instead of a second class of traffic (e.g., Class C traffic). In process block 134, the processor 12 opens a first session to use the network interface 26 for the first traffic class (e.g., Class D traffic).

In process block 136, the address generator module 29 generates a first address for the first session having an indication of the first traffic class (e.g., the traffic class identifier) in one or more most significant bits of an interface identifier of the first address. The address generator module 29 may generate the ULA prefix of the first address, as well as randomly generate the remainder of the interface identifier.

In process block 138, the processor 12 receives first data at the first address using the first session (from the second device). That is, the first data may be of the first traffic class, and may be received at the first address because the source address from which the first data was sent may have the same ULA prefix followed by the indication of the first traffic class in one or more most significant bits of the interface identifier.

In process block 140, the processor 12 decrypts the first data of the first traffic class using a first encryption key 32 associated with the first traffic class. That is, the first traffic class may be associated with a first security association, which may in turn be associated with the first encryption key 32. This first encryption key 32 was used to encrypt the first data of the first traffic class at the second device, and may be used at the first device to decrypt the first data.

In process block 142, the processor 12 may receive indications that the first device and the second device are unlocked. It should be understood that the indications of the devices 10, 50 are unlocked are merely illustrative examples, and any suitable indication that the devices 10, 50 are in states to receive a class of data different from the first traffic class is contemplated. In process block 144, the processor 12 opens a second session to use the network interface 26 for the second traffic class (e.g., Class C traffic).

In process block 146, the address generator module 29 generates a second address for the second session having an indication of the second traffic class (e.g., the traffic class identifier) in one or more most significant bits of an interface identifier of the second address. The address generator module 29 may generate the ULA prefix of the second address, which may be the same as the ULA prefix of the first address, as well as randomly generate the remainder of the interface identifier, which may be the same as the remainder of the interface identifier of the first address.

In process block 148, the processor 12 receives second data at the second address using the second session (from the second device). That is, the second data may be of the second traffic class, and may be received at the second address because the source address from which the second data was sent may have the same ULA prefix followed by the indication of the second traffic class in one or more most significant bits of the interface identifier.

In process block 150, the processor 12 decrypts the second data of the second traffic class using a second encryption key 32 associated with the second traffic class. That is, the second traffic class may be associated with a second security association, which may in turn be associated with the second encryption key 32. This second encryption key 32 was used to encrypt the second data of the second traffic class at the second device, and may be used at the second device to decrypt the second data.

In this manner, the method 130 may enable the electronic device 10 to receive data of different traffic classes 67 or having different security associations 68 using the same network interface 26, while ensuring that the proper encryption key 32 is used to decrypt the data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. One or more tangible, non-transitory, computer-readable media, comprising computer-readable instructions that, when executed by one or more processors of an electronic device, cause the one or more processors to:
   open a session to use a network interface of the electronic device for communicating data of a traffic class;
   generate a source address for the session having an indication of the traffic class and based on being a longest matching address of a plurality of possible source addresses to a destination address having the indication of the traffic class;
   encrypt the data of the traffic class using an encryption key associated with the traffic class to generate encrypted data; and
   send the encrypted data to the destination address having the indication of the traffic class.

2. The one or more tangible, non-transitory, computer-readable media of claim 1, wherein the source address comprises a unique local address prefix and an interface identifier, wherein one or more most significant bits of the interface identifier comprises the indication of the traffic class.

3. The one or more tangible, non-transitory, computer-readable media of claim 2, wherein a remainder of the interface identifier is randomly generated.

4. The one or more tangible, non-transitory, computer-readable media of claim 1, wherein the computer-readable instructions cause the one or more processors to:
   open an additional session to use the network interface for communicating additional data of an additional traffic class;
   generate an additional source address for the additional session having an indication of the additional traffic class;
   encrypt the additional data of the additional traffic class using a second encryption key associated with the additional traffic class to generate additional encrypted data; and
   send the additional encrypted data to an additional destination address having the indication of the additional traffic class.

5. The one or more tangible, non-transitory, computer-readable media of claim 4, wherein the additional source address comprises a unique local address prefix and an interface identifier, wherein one or more most significant bits of the interface identifier comprises the indication of the additional traffic class.

6. The one or more tangible, non-transitory, computer-readable media of claim 1, wherein the computer-readable instructions cause the one or more processors to select the source address based on one or more rules of a network layer protocol.

7. The one or more tangible, non-transitory, computer-readable media of claim 6, wherein the network layer protocol comprises Internet Protocol version 6.

8. The one or more tangible, non-transitory, computer-readable media of claim 1, wherein the computer-readable instructions cause the one or more processors to set the destination address to have the same unique local address as the source address followed by the indication of the traffic class.

9. An electronic device comprising:
a network interface;
one or more storage devices configured to store a policy table;
one or more processors configured to:
open a session to use the network interface for communicating data of a traffic class;
generate a source address for the session having an indication of the traffic class and based on being a longest matching address of a plurality of possible source addresses to a destination address having the indication of the traffic class;
encrypt the data of the traffic class using an encryption key associated with the traffic class to generate encrypted data; and
send the encrypted data to the destination address having the indication of the traffic class.

10. The electronic device of claim 9, wherein the one or more processors are configured to open the session to use the network interface for communicating the data of the traffic class in response to receiving an indication of a connection to an additional electronic device using the network interface.

11. The electronic device of claim 9, wherein the one or more processors are configured to:
open an additional session to use the network interface for communicating additional data of an additional traffic class;
generate an additional source address for the additional session having an indication of the additional traffic class;
encrypt the additional data of the additional traffic class using a second encryption key associated with the additional traffic class to generate additional encrypted data; and
send the additional encrypted data to an additional destination address having the indication of the additional traffic class.

12. The electronic device of claim 11, wherein the one or more processors are configured to open the additional session to use the network interface for communicating additional data of the additional traffic class in response to receiving indications that the electronic device and an additional electronic device are unlocked.

13. The electronic device of claim 9, wherein the source address and the destination address each comprises 128 bits.

14. The electronic device of claim 13, wherein the source address and the destination address each comprises a first 64 bit unique local address prefix.

15. The electronic device of claim 14, wherein the source address and the destination address each comprises a second 64 bit interface identifier, wherein the second 64 bit interface identifier comprises the indication of the traffic class.

16. The electronic device of claim 9, wherein the source address comprises an interface identifier, wherein a first portion of the interface identifier comprises the indication of the traffic class, and wherein a remaining portion of the interface identifier is randomly generated.

17. A computer-implemented method comprising:
opening, via a computer, a session to use a network interface of an electronic device for communicating encrypted data of a traffic class;
generating, via the computer, an address for the session having an indication of the traffic class, wherein the address comprises an interface identifier, wherein a first portion of the interface identifier comprises the indication of the traffic class, and wherein a remaining portion of the interface identifier is randomly generated;
receiving, via the computer, the encrypted data of the traffic class at the address using the session; and
decrypting, via the computer, the encrypted data using an encryption key associated with the traffic class.

18. The computer-implemented method of claim 17, wherein opening the session to use the network interface for communicating the encrypted data of the traffic class occurs in response to receiving an indication of a connection to an additional electronic device using the network interface.

19. The computer-implemented method of claim 17, comprising:
opening, via the computer, an additional session to use the network interface for communicating additional encrypted data of an additional traffic class;
generating, via the computer, an additional address for the additional session having an indication of the additional traffic class;
receiving, via the computer, the additional encrypted data of the additional traffic class at the additional address using the additional session; and
decrypting, via the computer, the additional encrypted data using an additional encryption key associated with the additional traffic class.

20. The computer-implemented method of claim 19, wherein opening the additional session to use the network interface for communicating the additional encrypted data of the additional traffic class occurs in response to receiving indications that the electronic device and an additional electronic device are unlocked.

\* \* \* \* \*